(12) United States Patent
Tsai et al.

(10) Patent No.: US 9,641,451 B2
(45) Date of Patent: May 2, 2017

(54) METHOD FOR ALLOCATING CLOUD SERVICE TO SERVERS OF DATA CENTER

(71) Applicant: Acer Incorporated, New Taipei (TW)

(72) Inventors: Lin-Jiun Tsai, New Taipei (TW); Wan-Jiun Liao, New Taipei (TW)

(73) Assignee: Acer Incorporated, New Taipei (TW)

( * ) Notice: Subject to any disclaimer, the term of this patent is extended or adjusted under 35 U.S.C. 154(b) by 176 days.

(21) Appl. No.: 14/332,407

(22) Filed: Jul. 16, 2014

(65) Prior Publication Data

US 2015/0207755 A1    Jul. 23, 2015

(30) Foreign Application Priority Data

Jan. 23, 2014  (TW) .............................. 103102466 A

(51) Int. Cl.
    *G06F 13/00*      (2006.01)
    *H04L 12/917*     (2013.01)

(52) U.S. Cl.
    CPC .................................... *H04L 47/76* (2013.01)

(58) Field of Classification Search
    CPC ............... H04L 29/08144; H04L 29/06; H04L 29/08072; H04L 29/08171; H04L 12/5695; H04L 47/76
    USPC ....................................................... 709/226
    See application file for complete search history.

(56) References Cited

U.S. PATENT DOCUMENTS

| | | | |
|---|---|---|---|
| 8,019,732 B2 | 9/2011 | Paterson-Jones et al. | |
| 2004/0054780 A1* | 3/2004 | Romero | H04L 41/5025 709/226 |
| 2010/0027420 A1 | 2/2010 | Smith | |
| 2011/0246627 A1 | 10/2011 | Kern | |
| 2012/0222037 A1* | 8/2012 | Labat | G06F 9/5072 718/104 |
| 2012/0240114 A1 | 9/2012 | Muller | |
| 2012/0297238 A1 | 11/2012 | Watson et al. | |
| 2012/0331147 A1* | 12/2012 | Dutta | G06F 9/06 709/226 |
| 2013/0125116 A1 | 5/2013 | Liu et al. | |
| 2013/0311662 A1 | 11/2013 | Stolyar | |

(Continued)

FOREIGN PATENT DOCUMENTS

| | | |
|---|---|---|
| CN | 101924693 | 12/2010 |
| CN | 102057367 | 5/2011 |
| CN | 102739771 | 10/2012 |

(Continued)

*Primary Examiner* — Robert B Harrell
(74) *Attorney, Agent, or Firm* — Jianq Chyun IP Office

(57) ABSTRACT

A dynamic planning method for server resources of a data center is provided. The data center includes multiple pods and each pod includes multiple racks configurable with multiple servers. In the method, a rack having a remaining space larger than or equal to d is searched from the pods and used for configuring d servers. If the rack cannot be configured with the d servers, a single pod reallocation is executed on one of the pods to empty a rack so that the remaining space of the rack is larger than or equal to d and configurable with the d servers. If there is no rack that can be emptied, a cross-pod reallocation is executed to empty corresponding server positions of corresponding racks in the pods so that the remaining space of the corresponding server positions is larger than or equal to d and configurable with the d servers.

20 Claims, 12 Drawing Sheets

(56) References Cited

U.S. PATENT DOCUMENTS

2013/0343394 A1* 12/2013 Li ...................... H04L 12/4641
370/392

FOREIGN PATENT DOCUMENTS

| CN | 103067514 | 4/2013 |
|---|---|---|
| CN | 103443771 | 12/2013 |
| CN | 103516759 | 1/2014 |
| TW | 201327205 | 7/2013 |

* cited by examiner

FIG. 2

METHOD FOR ALLOCATING CLOUD SERVICE TO SERVERS OF DATA CENTER

CROSS-REFERENCE TO RELATED APPLICATION

This application claims the priority benefit of Taiwan application serial no. 103102466, filed on Jan. 23, 2014. The entirety of the above-mentioned patent application is hereby incorporated by reference herein and made a part of this specification.

TECHNICAL FIELD

The invention relates to a planning method for server resources. More particularly, the invention relates to a dynamic planning method for server resources of a data center.

DESCRIPTION OF RELATED ART

In order to achieve economy of scale and to provide tenants with almost unlimited computational power and storage capabilities, current cloud data centers typically include thousands of servers connected to each other by network. Only a portion of the servers and the network is rented out to each tenant in order to ensure a stable and highly efficient cloud service for the end user. Due to the data center operators striving toward increasing resource utilization to optimize profits from available assets, high efficient resource planning methods have become critical techniques for cloud data centers.

The cloud services established by each data center for the tenants are diverse and may vary in magnitude. Moreover, the network bandwidth demanded by each individual service is also unpredictable or highly elastic. However, the network topology provided for each cloud service by the resource allocation mechanism of the current data centers is not a non-blocking network. Therefore, in many circumstances, even if the network topology occupied by the service has leftover bandwidth, this bandwidth cannot be fully utilized due to network flow congestion at certain nodes. At the same time, because of the sharing of network resources, the transmission paths of different cloud services may mutually interfere. Accordingly, the currently available mechanisms cannot address all three concerned areas of data centers, including resource utilization rate, network efficiency, and service stability. Moreover, current hybrid network resource sharing mechanisms in the data centers may bring data security loopholes. Therefore, a mature and integrated solution is still needed to resolve these challenges.

SUMMARY OF THE INVENTION

The invention provides a dynamic planning method for server resources of a data center, capable of optimizing the resource utilization rate, network efficiency, and service stability of the data center.

In the invention, a dynamic planning method for server resources of a data center, adapted to a data center for allocating a service, is provided, in which the service requests to configure d servers. The data center includes a plurality of pods, each of the pods including a plurality of racks respectively connected to a plurality of edge switches. Each of the racks is disposed with a plurality of servers, and the servers are sequentially coupled to a plurality of aggregation switches by the connected edge switches, in which d is a positive integer. The method searches for a rack having a remaining space larger than or equal to d from all of the pods, for allocating the d servers to the rack. If the rack cannot be found, a single pod reallocation is executed on one of the pods to empty one of the racks of the pod, in order to facilitate the rack so the remaining space of the rack is larger than or equal to d, and the d servers are allocated to the rack. If no rack in the pod can be emptied, a cross-pod reallocation is executed on all of the pods to empty the corresponding server positions of the corresponding racks in the pods, in order for the remaining space of the corresponding server positions to be larger than or equal to d, and the d servers are allocated to the corresponding server positions.

According to an embodiment of the invention, the step of searching for the rack having the remaining space larger than or equal to d from the pods, for allocating the d servers to the rack includes searching for at least one pod having a total remaining space that is the most from the pods. The total remaining space is a sum of the remaining spaces of all of the racks in each of the pods. Thereafter, a first pod placed in front of the pods is selected to allocate the service.

According to an embodiment of the invention, after the step of selecting the first pod placed in front of the pods to allocate the service, the method further determines whether the total remaining space of the first pod is smaller than d. If the total remaining space is smaller than d, the allocation of the service is terminated.

According to an embodiment of the invention, the step of executing the single pod reallocation on one of the pods includes executing the single pod reallocation on the first pod.

According to an embodiment of the invention, the step of searching for the rack having the remaining space larger than or equal to d from the pods, for allocating the d servers to the rack further includes allocating the d servers to the server positions placed in front of the rack.

According to an embodiment of the invention, the step of executing the single pod reallocation on one of the pods to empty one of the racks of the pod, in order to facilitate the rack so the remaining space of the rack is larger than or equal to d includes building a placement list including a plurality of reallocation placements for the pod. The reallocation placements include the exchanges of two server positions in the pod, and the exchanges of the corresponding server positions between the pods. Thereafter, for each of the racks in the pod, all of the reallocation placements of the server positions in the rack are represented by using a bipartite graph, and a plurality of non-overlapping reallocation placement sets are selected by using a maximum cardinality bipartite matching algorithm. The rack from the reallocation placement sets in the pod having a placement quantity larger than or equal to d is selected, and d reallocation placements are executed on the rack, so as to empty the rack.

According to an embodiment of the invention, the step of selecting the rack from the reallocation placement sets in the pod having the placement quantity larger than or equal to d includes selecting a first rack placed in front of the racks from the reallocation placement sets in the pod having the placement quantity larger than or equal to d.

According to an embodiment of the invention, the step of executing the d reallocation placements on the rack to empty the rack includes executing the d reallocation placements in front of the reallocation placements of the rack, so as to empty the rack.

According to an embodiment of the invention, the step of building the placement list including the reallocation placements for the pod includes adding the exchanges of any two server positions to the plurality of corresponding server positions between the racks of the pod to the placement list; adding the exchanges of any two server positions not belonging to the same rack in the pod and not belonging to the same corresponding server positions between the racks to the placement list; and adding the exchanges of any two corresponding server positions between the pods to the placement list.

According to an embodiment of the invention, the step of executing the cross-pod reallocation on all of the pods to empty the corresponding server positions of the corresponding racks in the pods, in order to facilitate the remaining space of the corresponding server positions to be larger than or equal to d includes building a placement list including a plurality of reallocation placements for each of the pods, in which the reallocation placements includes every empty server position and the exchanges of two server positions in each of the pods. A reallocable pod quantity is calculated for each of the corresponding server positions (a, e) between the pods, in which a represents an assigned label of the corresponding aggregation switch, and e represents an assigned label of the corresponding edge switch. The server positions (a, e) having a reallocable pod quantity larger than or equal to d are then selected. The reallocation placements are executed on the pods having reallocable server positions (a, e), so as to empty the corresponding server positions (a, e) of the corresponding racks in the pods.

According to an embodiment of the invention, the step of selecting the server positions (a, e) having the reallocable pod quantity larger than or equal to d includes selecting a first server position (a, e) placed in front of the server positions (a, e) having the reallocable pod quantity larger than or equal to d.

According to an embodiment of the invention, the step of executing the reallocation placement on the reallocable pods for the server positions (a, e), so as to empty the corresponding server positions (a, e) of the corresponding racks in the pods includes executing the d reallocation placements placed ahead on the pods having reallocable server positions (a, e), so as to empty the corresponding server positions (a, e) of the corresponding racks in the pods.

According to an embodiment of the invention, the step of building the placement list comprising the reallocation placements for each of the pods includes adding every empty server position in the pod to the placement list; adding the exchanges of any two server positions in the plurality of corresponding server positions between the racks of the pod to the placement list; and adding the exchanges of any two server positions not belonging to the same rack in the pod and not belonging to the same corresponding server positions between the racks to the placement list.

In summary, according to embodiments of the invention, the dynamic planning methods for server resources of a data center designed specific data allocation modes for the fat-tree network topology. Combined with procedures such as the single pod reallocation procedure, the cross-pod reallocation procedure, and the reallocation placement listing, resource allocation mechanisms which can be parallel processed are proposed. Accordingly, the dynamic planning method only requires a low frequency of resource movements in the reallocation process to satisfy the demands of different cloud services, and the resource utilization rate, network efficiency, and service stability of the data center can be optimized.

To make the above features and advantages of the invention more comprehensible, several embodiments accompanied with drawings are described in detail as follows.

BRIEF DESCRIPTION OF THE DRAWINGS

The accompanying drawings are included to provide further understanding, and are incorporated in and constitute a part of this specification. The drawings illustrate embodiments and, together with the description, serve to explain the principles of the invention.

FIG. 2 is a schematic view of a single server allocation according to an embodiment of the invention.

DESCRIPTION OF EMBODIMENTS

The invention is directed towards designing a plurality of specialized resource allocation modes for a fat-tree network topology capable of providing non-blocking network topologies to each cloud service, and therefore suitable for changing network bandwidth demands. Moreover, the invention is also directed towards designing resource reallocation mechanisms in accordance with the characteristics of these specialized resource allocation modes, which are capable of rapidly calculating guaranteed feasible resource reallocation placements that can be processed in parallel in polynomial time. Accordingly, the fragmented resources can be recombined and complete spaces can be arranged to satisfy the new demands of the cloud services.

Figure 1:
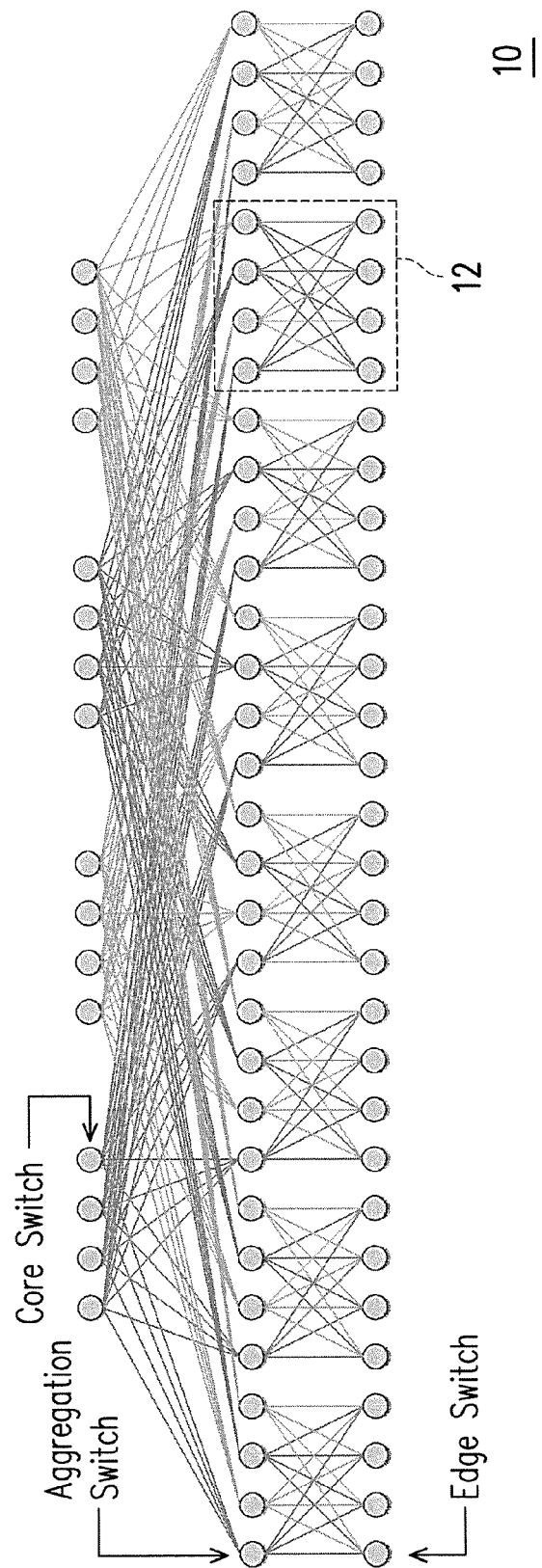
FIG. 1 is a schematic view of a fat-tree network topology according to an embodiment of the invention.

FIG. 1 is a schematic view of a fat-tree network topology according to an embodiment of the invention. With reference to FIG. 1, a network topology 10 of the present embodiment is an octary (8-ary) fat-free network topology constructed by 8-port switches. The network topology 10 includes 32 edge switches located in an edge layer, 32 aggregation switches located in an aggregation layer, and 16 core switches located in a core layer. Each of the edge switches may be respectively connected to 4 servers. Every four of the edge switches and the aggregation switches form a set that connect with each other, and the set may connect with 16 servers in a pod. For example, one pod may use 8 8-port switches 12 in the network topology 10, and the 16 servers in this pod may be connected with the 16 core switches of the core layer. It should be noted that, although the embodiment employ an 8-ary fat-tree network topology constructed by 8-port switches to facilitate description, the invention is not limited thereto. In actual applications, the invention is also suitable for use in networks of different size, such as 16-ary, 24-ary, and 48-ary networks.

The present embodiment allows each server belonging to a same service to connect to a common switch (e.g., may be an edge switch, an aggregation switch, or a core switch) by using one path, and from this common switch, connect to the core switch by using one path. Each path is at most used by one service, and the oversubscription ratio of this network topology is 1:1. Accordingly, cloud services with unpredictably changing demands may obtain full connection bandwidth under any data flow modes. Besides, since at most one cloud service is allocated to each network connection, interference from other cloud services at the same data center is prevented, thereby ensuring stability and efficiency while also reducing information security risks.

Four resource allocation modes are designed in the invention for different positions of the common switch. Since the hop distances and fault tolerances of these modes are different, they are suitable for cloud services having various needs. A single server allocation corresponds to cloud services having a server quantity demand of 1, in which only one edge switch is used to connect to one aggregation switch and then connect to one core switch. A single rack allocation corresponds to cloud services having a server quantity demand of d, in which all of the d servers are configured in a same rack, commonly connected to a same edge switch, connected to d aggregation switches, and then connected to d core switches. This type of allocation method has lower latency. A cross-rack allocation corresponds to cloud services having a server quantity demand of d, in which all of the d servers are respectively configured in d racks, and d edge switches are commonly used (e.g., each of the servers is connected to one edge switch) to connect to a same aggregation switch, and then to connect to d core switches. This type of allocation method has a preferable fault tolerance capability. A cross-pod allocation corresponds to cloud services having a server quantity demand of d, in which all of the d servers are respectively configured in d pods, and d edge switches are then used (e.g., each of the servers is connected to one edge switch) to connect d edge switches to d aggregation switches (e.g., each of the edge switches is connected to one aggregation switch), and to connect to a same core switch from different pods. This type of allocation method has preferable fault tolerance capability and resource utilization rate. These four resource allocation modes are further described with illustrative examples hereafter.

Figure 2:
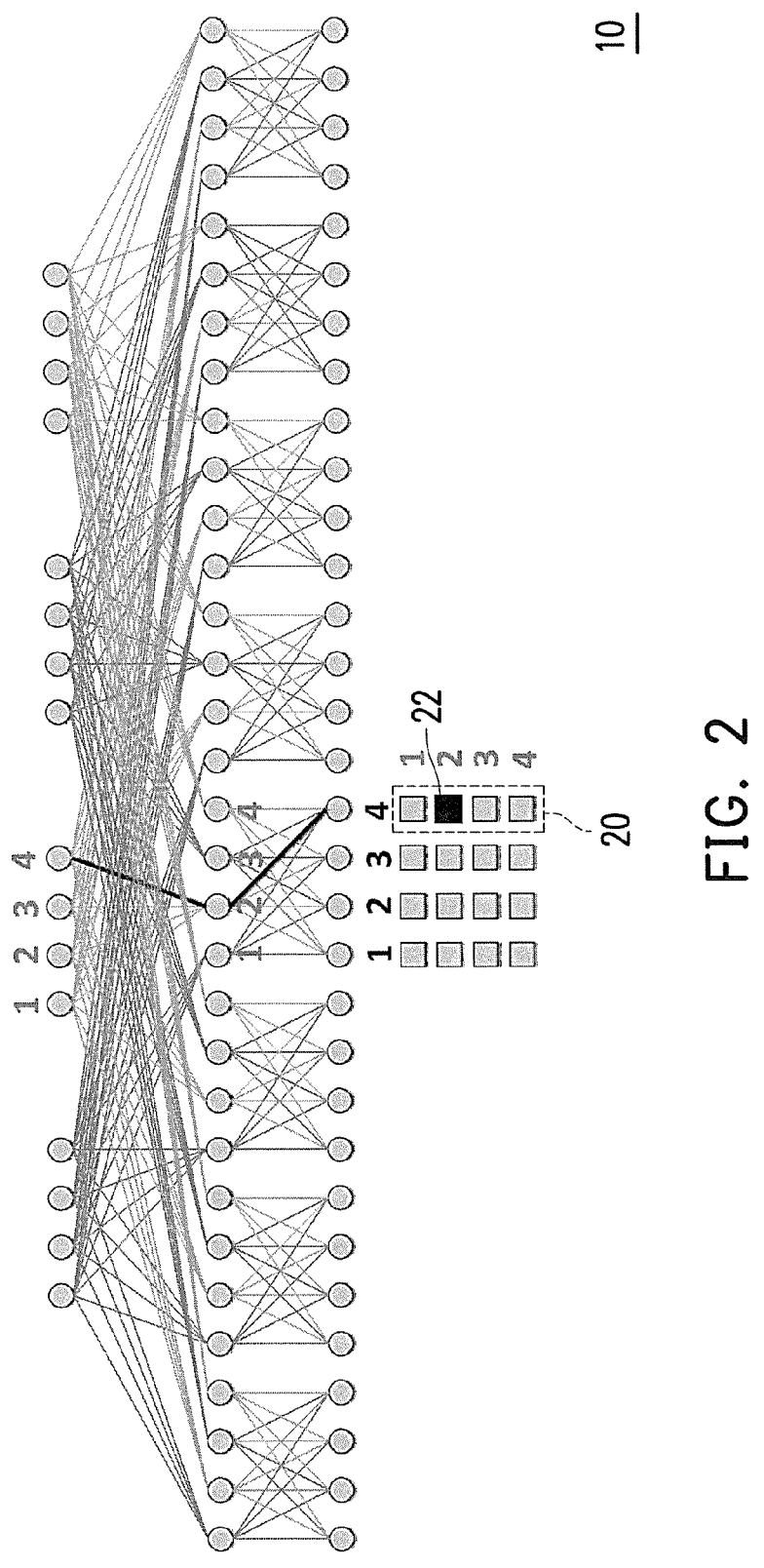

FIG. 2 is a schematic view of a single server allocation according to an embodiment of the invention. With reference to FIG. 2, the present embodiment is used to allocate cloud services having a server quantity demand of 1. In the embodiment, a server 22 is configured in a rack 20, and a connection path of the server 22 is established according to a position (e.g. a position 2) of the server 22 in the rack 20. The connection path includes, in sequence, an edge switch 4, an aggregation switch 2, and a core switch 4.

Figure 3:
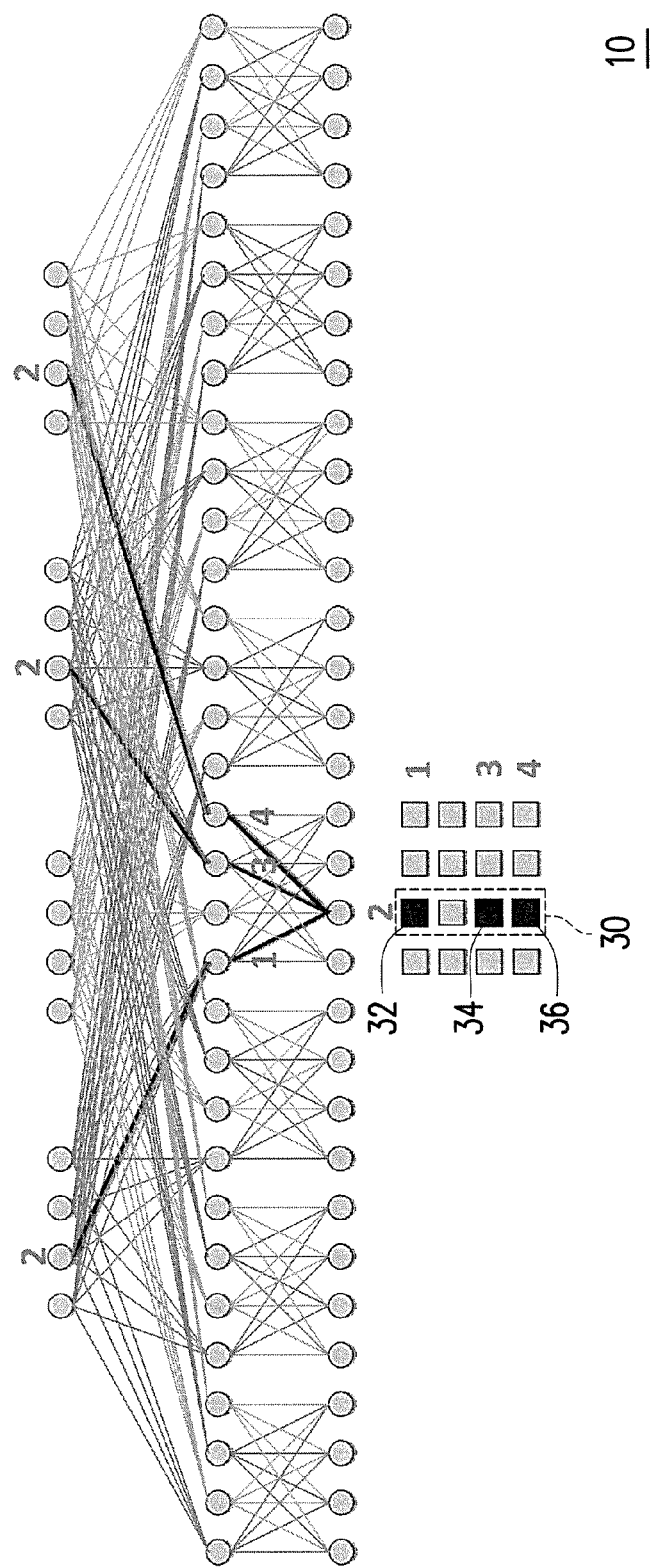
FIG. 3 is a schematic view of a single rack allocation according to an embodiment of the invention.

FIG. 3 is a schematic view of a single rack allocation according to an embodiment of the invention. With reference to FIG. 3, the present embodiment is used to allocate cloud services having a server quantity demand of 3 in a single rack. In the embodiment, the servers 32, 34, and 36 are configured in a same rack 30. The servers 32, 34, and 36 are commonly connected to a same edge switch 2 according to the positions of these servers in the rack 30 (e.g. positions 1, 3, and 4), then respectively connected to the aggregation switches 1, 3, and 4 by the edge switch 2, and then respectively connected to the core switches 2 of different positions by the aggregation switches 1, 3, and 4.

Figure 4:
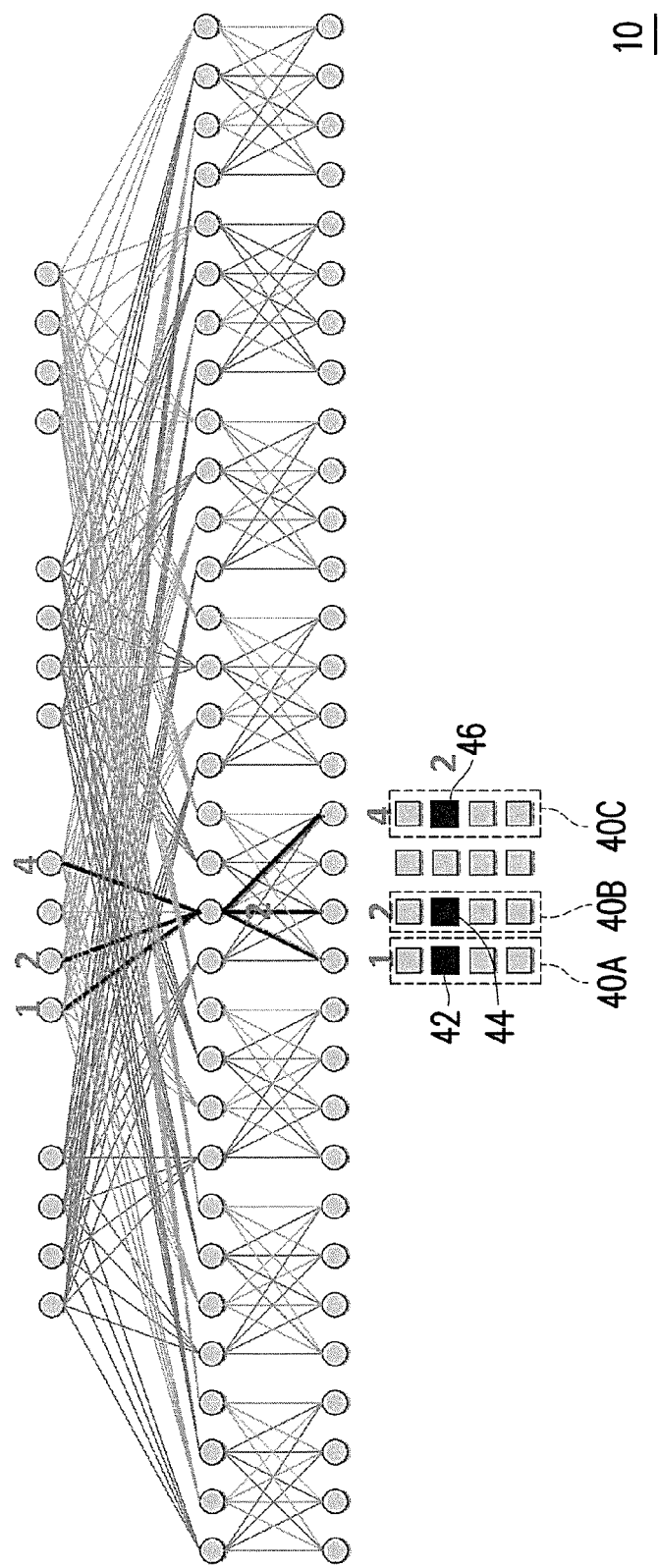
FIG. 4 is a schematic view of a cross-rack allocation according to an embodiment of the invention.

FIG. 4 is a schematic view of a cross-rack allocation according to an embodiment of the invention. With reference to FIG. 4, the present embodiment is used to allocate cloud services having a server quantity demand of 3 by employing cross-rack allocation. In the embodiment, the servers 42, 44, 46 are respectively configured in the racks 40A, 40B, and 40C, and the edge servers 1, 2, and 4 are respectively used to connect to a same aggregation server 2, and then connect to the core switches 1, 2, and 4 by the aggregation switch 2.

Figure 5:
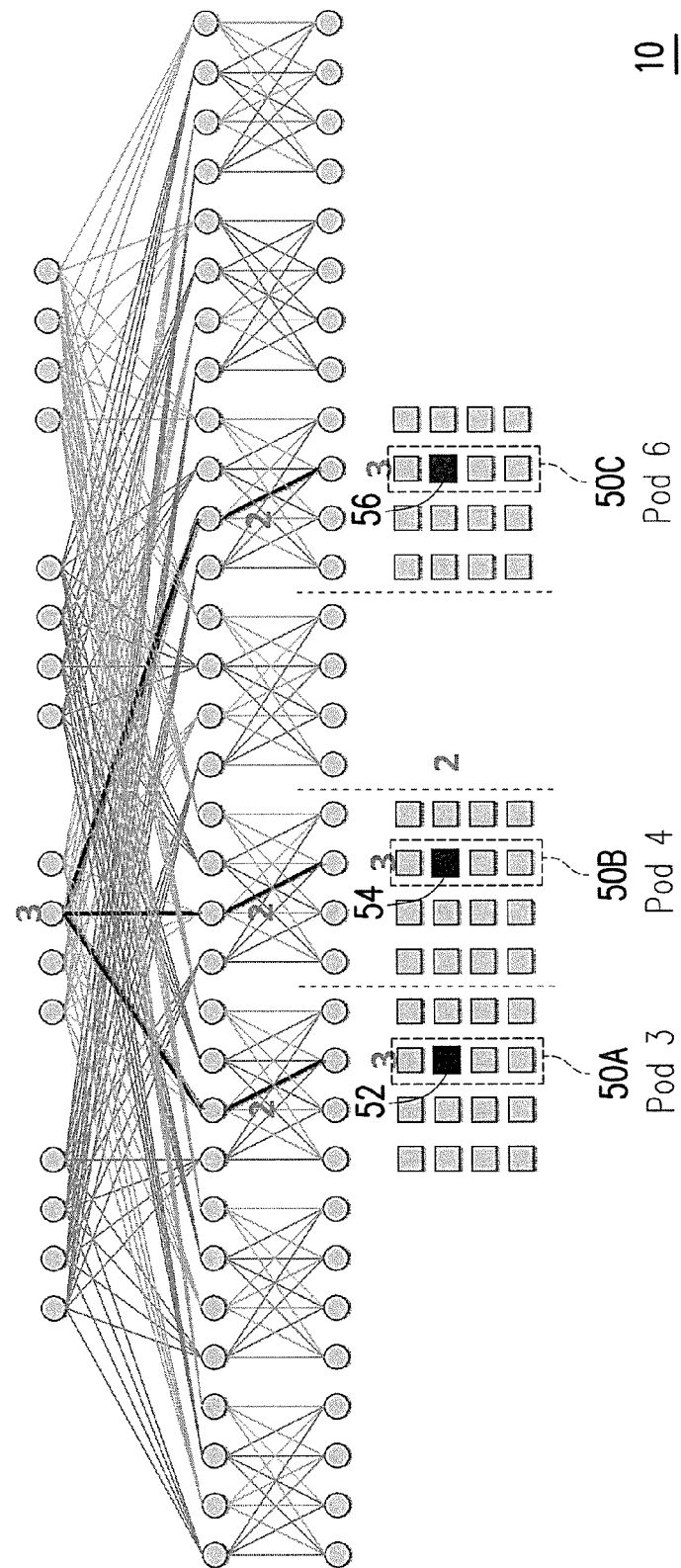
FIG. 5 is a schematic view of a cross-pod allocation according to an embodiment of the invention.

FIG. 5 is a schematic view of a cross-pod allocation according to an embodiment of the invention. With reference to FIG. 5, the present embodiment is used to allocate cloud services having a server quantity demand of 3 between different pods. In the embodiment, the servers 52, 54, and 56 are respectively configured in the racks of the corresponding positions in different pods (e.g., rack 50A of pod 3, rack 50B of pod 4, and rack 50C of pod 6), and also configured in the server positions of the corresponding positions. Moreover, three edge servers 3 located in different pods but having corresponding positions are used for connection (e.g., each of the servers is connected to one edge switch 3), and these three edge switches 3 are respectively connected to three aggregation switches 3 of different pods but having the corresponding positions (e.g., each of the edge switches 3 is connected to one aggregation switch 2), and these aggregation switches 2 are connected to a same core switch 3 from different pods.

It should be noted that, although the foregoing embodiments use the allocation and recombination of servers to facilitate description, the invention may also be applied to the selection of network paths. In other words, how the servers depicted from FIG. 2 to FIG. 5 connect to the core switches through the network. In specifics, when a data center selects a network path for the servers, the assigned labels of the switches corresponding to the assigned labels of the servers are selected in sequence, and the related paths are accordingly established. Moreover, in the embodiments depicted from FIG. 2 to FIG. 5, although each server and switch has been assigned with a label, these assigned labels merely serve to facilitate description. Furthermore, they are used only to represent the corresponding coupling relationships between the servers and the edge switches, aggregation switches, or the core switches, and the assigned labels do not exist in practice. In addition, the positions of the servers and switches depicted in the embodiments from FIG. 2 to FIG. 5 do not have an order in reality. Alternatively, different orders of the assigned labels can be employed in practice.

On the other hand, the fat-tree network topology has symmetric characteristics between uplink chains and downlink chains in the three switch layers. Therefore, in the aforementioned allocation mechanisms, the calculation of the resource allocation and reallocation may be limited to the edge switches, the aggregation switches, and all of the connections between the edge switches and the aggregation switches. That is, without calculating the entire network, the results from the calculation can still be easily transformed into a resource allocation result of the entire fat-tree network.

Accordingly, the invention adopts another perspective to describe the aforementioned allocation mechanisms, in which for any pod, all of the aggregation switches and the edge switches collectively form a bipartite graph which is represented by an equal two-dimensional matrix. Assuming a and e respectively represent the assigned labels of the aggregation switches and the edge switches, each set of (a, e) may represent a position of a certain path. Considering the fat-tree network includes a plurality of pods, therefore, the entire resource allocation and reallocation process of the fat-tree network may be viewed as operations performed on a three-dimensional matrix.

Figures 6A, 6B:
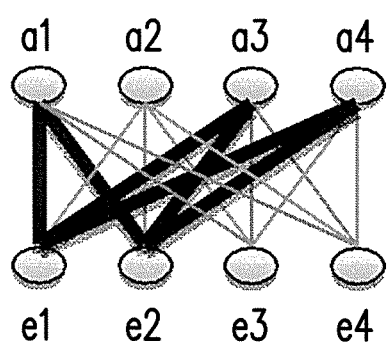
FIG. 6A and FIG. 6B are schematic views of a two-dimensional matrix representing an allocation of aggregation switches and edge switches according to an embodiment of the invention.

For example, FIG. 6A and FIG. 6B are schematic views of a two-dimensional matrix representing an allocation of aggregation switches and edge switches according to an embodiment of the invention. The thin lines shown in FIG. 6A depict all of the possible connections between the aggregation switches a1-a4 and the edge switches e1-e4, and the thick lines shown in FIG. 6A depict the actual connections between the aggregation switches a1-a4 and the edge switches e1-e4. If an equal two-dimensional matrix is used to represent the actual connections between the aggregation switches a1-a4 and the edge switches e1-e4, a two-dimensional matrix 60 as shown in FIG. 6B may be obtained.

Figure 7B:
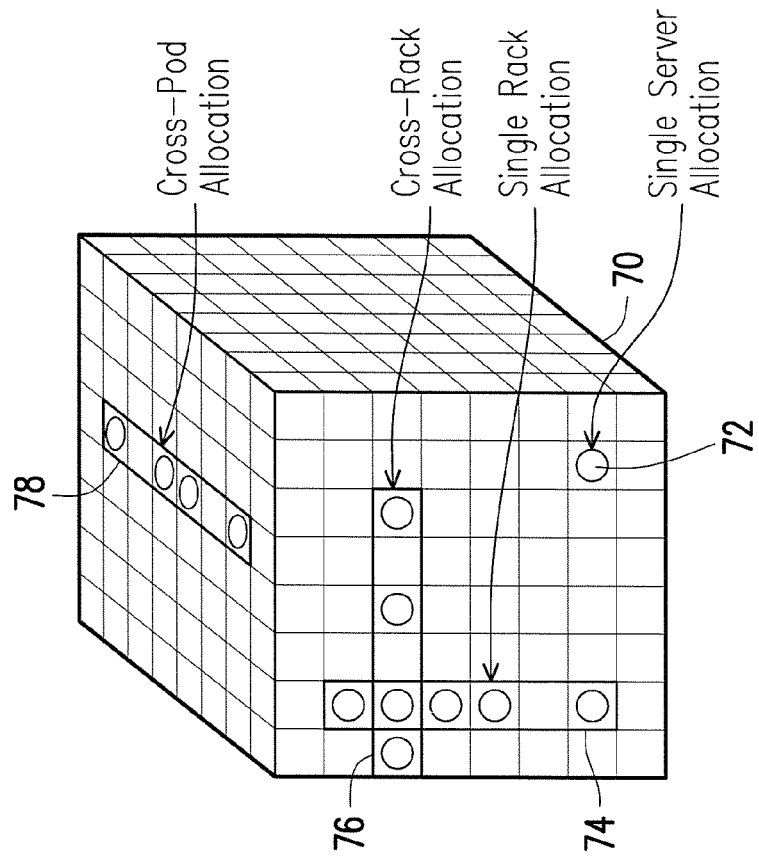
FIG. 7A and FIG. 7B are schematic views of a three-dimensional matrix representing an allocation of aggregation switches and edge switches from different pods according to an embodiment of the invention.
Figure 7A:
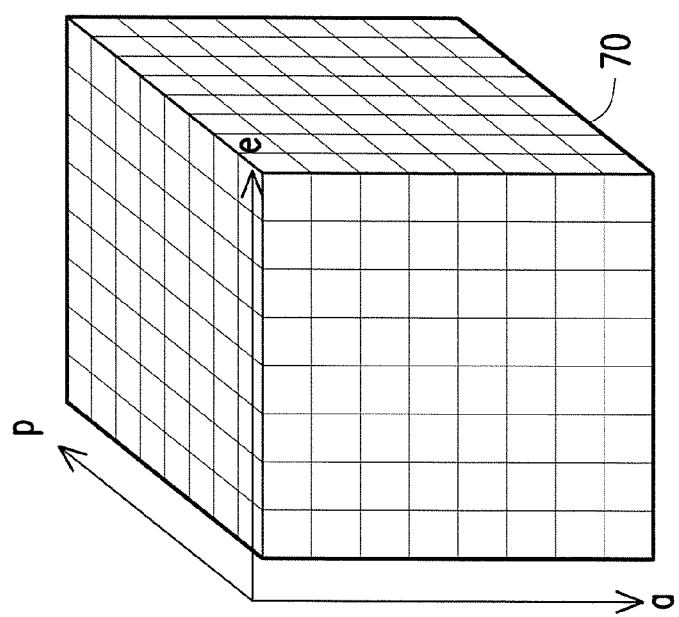

On the other hand, FIG. 7A and FIG. 7B are schematic views of a three-dimensional matrix representing an allocation of aggregation switches and edge switches from different pods according to an embodiment of the invention. With reference to FIG. 7A, the present embodiment uses the assigned labels of the aggregation switches (a-axis), the edge switches (e-axis), and the pods (p-axis) as the three axes of a three-dimensional space to illustrate a three-dimensional cube 70. Each node of the three-dimensional cube 70 represents different server position in the fat-tree network (e.g., each server position has an independent pod label, aggregation switch label, and edge switch label). With reference to FIG. 7B, if the afore-described single server allocation is represented by the three-dimensional cube 70, then the server may be represented by a node in the three-dimensional cube 70. If the afore-described single rack allocation is represented by the three-dimensional cube 70, then the servers to be allocated may be represented by the nodes on the a-axis direction in the three-dimensional cube 70 (e.g., positions on the e-axis and p-axis directions are fixed, such as in a node row 74). If the afore-described cross-rack allocation is represented by the three-dimensional cube 70, then the servers to be allocated may be represented by the nodes on the e-axis direction in the three-dimensional cube 70 (e.g., positions on the a-axis and p-axis directions are fixed, such as in a node row 76). If the afore-described cross-pod allocation is represented by the three-dimensional cube 70, then the servers to be allocated may be represented by the nodes on the p-axis direction in the three-dimensional cube 70 (e.g., positions on the a-axis and e-axis directions are fixed, such as in a node row 78).

Based on the afore-described allocation mechanisms, the invention divides the entire resource allocation mechanism into one main procedure and three sub-procedures (e.g., a single pod reallocation procedure, a cross-pod reallocation procedure, and a row and column reallocation placement procedure, respectively). The three sub-procedures may be called when necessary by the main procedure, and the main procedure performs resource allocation to a cloud service. When the remaining space cannot be directly deployed for the service request, the main procedure calls the sub-procedures to search for a resource reallocation placement and to select a suitable placement with preferably low reallocation cost. If the reallocation is feasible, the resources are reallocated, and the service request is deployed.

It should be noted that, the embodiments hereafter are deployed for a single rack allocated service. However, as described earlier, the allocation and reallocation process only calculates a partial topology (e.g. the aggregation layer and the edge layer) of the fat-tree network, and the partial topology has a symmetric shape. Therefore, if deployment is demanded for a cross-rack allocation service, in one embodiment, the aforementioned topology may be turned over. That is, a transposition may be performed on the two-dimensional matrix of each pod. Moreover, a currently operating single rack allocation may be temporarily viewed as a cross-rack allocation service, and a currently operating cross-rack allocation my be viewed as a single rack allocation service, and a reallocation may be performed by using the methods described hereafter. When the reallocation procedure is completed, the allocation result is transformed back to an original state (e.g., the reallocation result of the cross-rack allocation service is transformed back to the result of the single rack allocation service, and the reallocation result of the single rack allocation service is transformed back to the result of the cross-rack allocation service). Furthermore, in another embodiment, the three-dimensional matrix depicted by FIG. 7A and FIG. 7B may be rotated by 90 degrees to serve as an input for the allocation procedure, such that the same procedure may be used to deploy the cross-rack allocation service. Moreover, if insufficient remaining space is discovered during the process of the afore-described single rack allocation and cross-rack allocation, the cross-pod allocation mode may be used instead for deployment to different pods. Whether this type of cross-pod resource allocation and reallocation is supported may be adjusted with considerations to different operating strategies, and therefore no limitations are set in the invention.

In one embodiment of the invention, a basic principle of the service deployment is to search for a remaining space matching the demanded type in the afore-described matrix. In the present embodiment, although the remaining space is not required to be continuous, the remaining space must be in a same column (or row). For the reallocation procedure, each of the allocation modes may move on a certain direction. Therefore, the reallocation procedure may find a plurality of reallocation placements, which are a plurality of sets of movement path matches and sequences, such that under a limited number of movements, suitable amount of remaining space can be facilitated to deploy incoming cloud services.

Figure 8A:
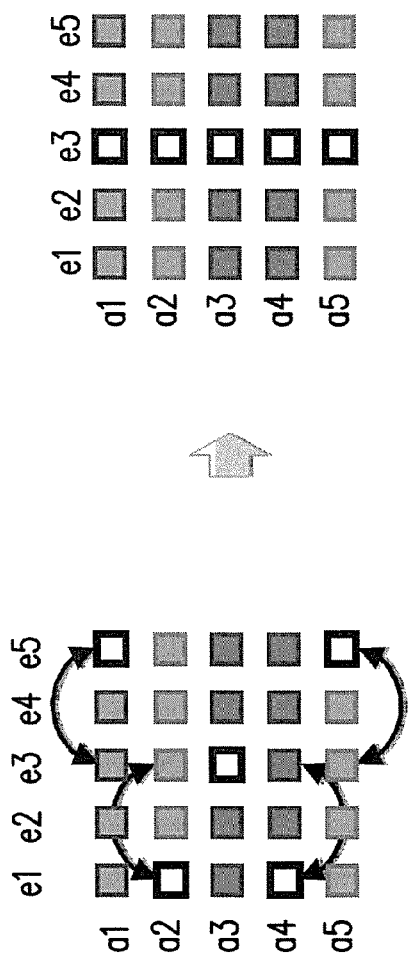
FIG. 8A and FIG. 8B are schematic views illustrating a reallocation placement procedure according to an embodiment of the invention.
Figure 8B:
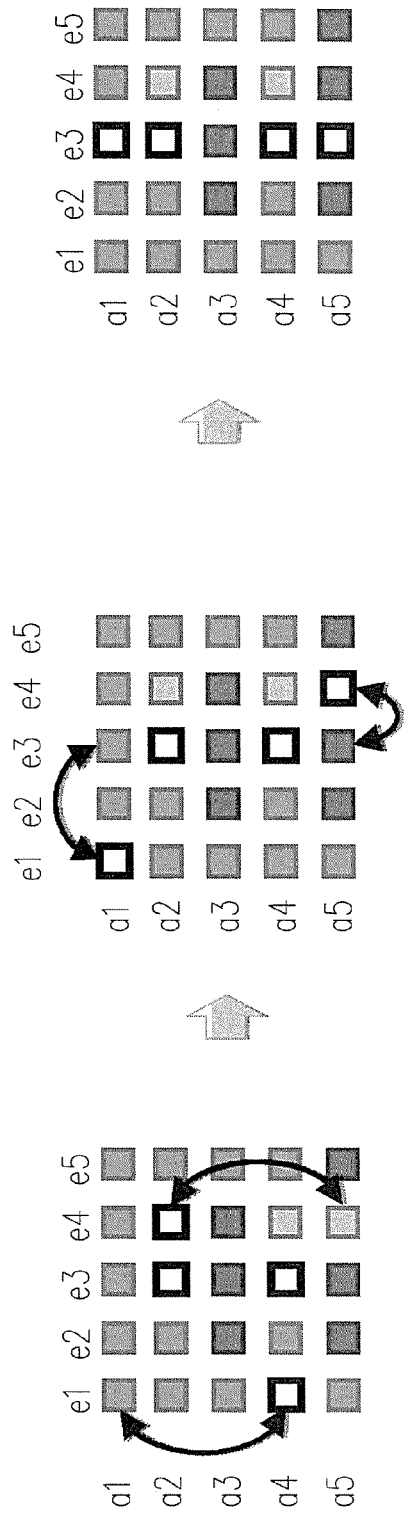

For example, FIG. 8A and FIG. 8B are schematic views exemplifying a reallocation placement procedure according to an embodiment of the invention. With reference to FIG. 8A, the present embodiment illustrates a reallocation placement of server positions in a single pod, in which all of the server positions may be represented by (a, e), where a represents the aggregation switches a1-a4, and e represents the edge switches e1-e4. If the reallocation placement needs to empty the server positions under the edge switch e3 to perform the single rack allocation, and a moveable frequency of each server position (e.g. a reallocation cost limit) is limited to 1, then the empty server positions (e1, a2), (e1, a4), (e5, a1), and (e5, a5) may be respectively switched with the server positions (e3, a2), (e3, a4), (e3, a1), and (e3, a5) under the edge switch e3, so as to facilitate the remaining space of the edge switch e3 for allocation in incoming cloud services. With reference to FIG. 8B, if the reallocation placement needs to empty the server positions under the edge switch e3 to perform the single rack allocation, and a moveable frequency of each server position is limited to 2, then the empty server positions (e1, a4) and (e4, a2) may be first respectively switched with the server positions (e1, a1) and (e4, a5) under the same rack. Thereafter, the emptied server positions (e1, a1) and (e4, a5) are switched with the server positions (e3, a1) and (e3, a5) under the edge switch e3, so as to facilitate the remaining space of the edge switch e3 for allocation in incoming cloud services.

A detailed implementation of the main procedure and the three sub-procedures of the resource allocation mechanism in the invention are described hereafter. The main procedure may be executed by a data center, for example, in order to perform dynamic planning for server resources in accordance with the service requests issued by users or remote tenants. The data center in the present embodiment includes a plurality of pods. Each of the pods includes a plurality of racks, and the racks may be respectively connected to a plurality of edge switches. Each of the racks may be disposed with a plurality of servers, and the servers may be connected sequentially to a plurality of aggregation switches by the connected edge switches.

Figure 9:
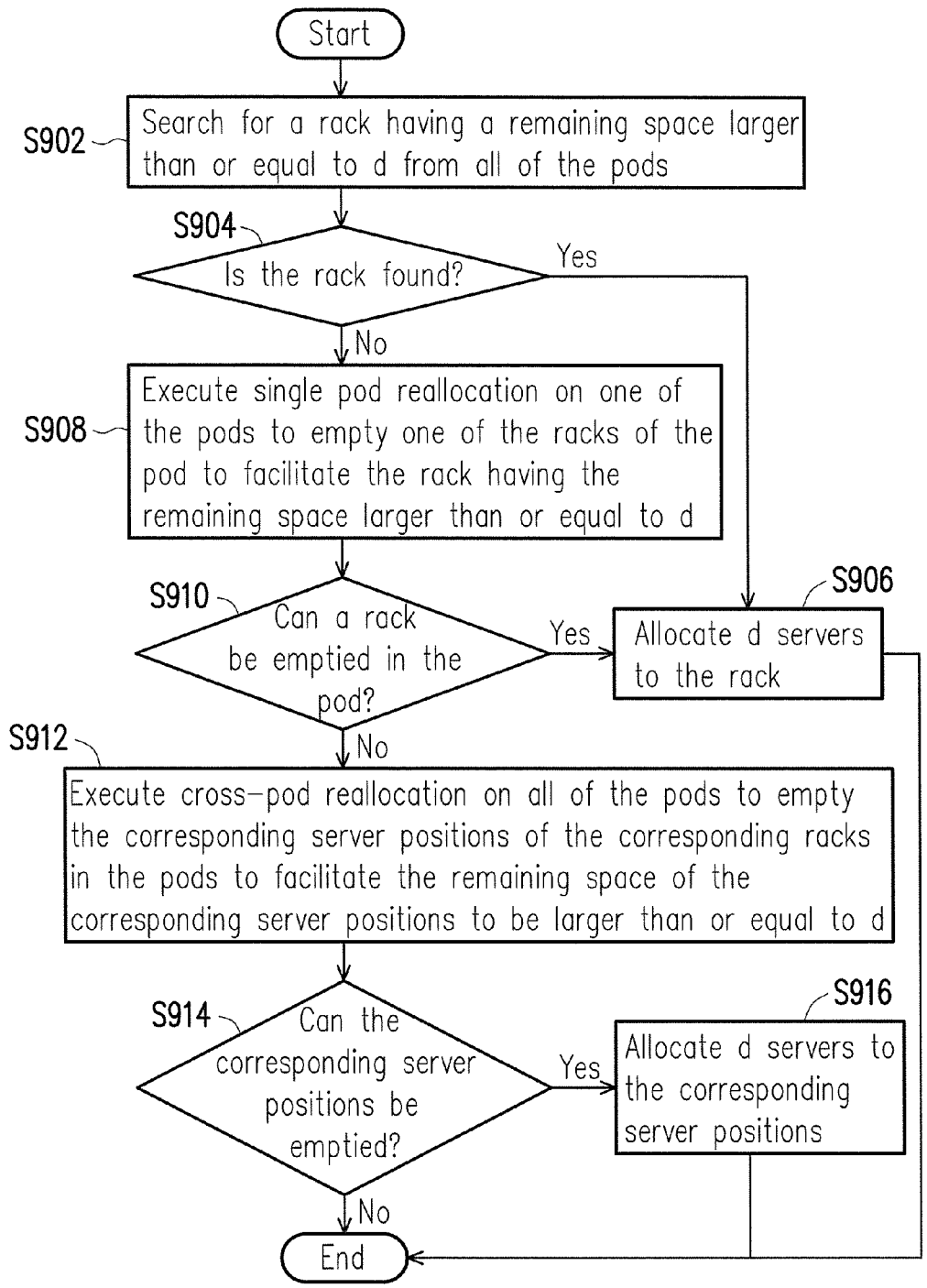
FIG. 9 is a flow diagram of a dynamic planning method for server resources of a data center according to an embodiment of the invention.

FIG. 9 is a flow diagram of a dynamic planning method for server resources of a data center according to an embodiment of the invention. With reference to FIG. 9, the method of the present embodiment is adapted to the afore-described data center. The data center may execute the main procedure to allocate a single rack allocation cloud service having a server quantity demand of d, in which d is a positive integer.

The data center searches for a rack having a remaining space larger than or equal to d from all of the pods (Step S902), and determines whether this rack has been found (Step S904). For example, the data center may search for at least one pod having a total remaining space that is the most from all of the pods. The total remaining space is a sum of the remaining spaces of all of the racks in each of the pods. When there are more than one pods with the most total remaining space, the data space may select a first pod placed in front of the pods to allocate the service, for instance. After selecting the first pod, the data center may further determine whether the total remaining space of the first pod is smaller than d. If the total remaining space of the first pod is smaller than d, this represents that all of the pods cannot fulfill the service, and the allocation of the service may be terminated.

In Step S904, if the data center has found a rack having a remaining space larger than or equal to d, then the d servers may be allocated to the rack (Step S906). If the data center found the remaining space of the rack to be larger than d, the d servers may be allocated to a plurality of empty server positions placed in front of the rack. In other words, empty server positions are available from the first server position to the d server position. It should be noted that, it is not necessary to successively allocate the d servers. If d successive empty spaces that are placed in front are not available, then the d servers may be allocated in a non-successive manner in the rack.

On the other hand, in Step S904, if the data center cannot find the rack, the single pod reallocation is executed on one of the pods to empty one of the racks of the pod, in order to facilitate the rack so the remaining space of the rack is larger than or equal to d (Step S908). For example, the data center may select, from all of the pods, a first pod having the most total remaining space that is placed in front to execute the single pod reallocation, although the invention is not limited thereto. It should be noted that, in Step S908, the main procedure may call the single pod reallocation procedure to execute the single pod reallocation on the aforementioned pod.

Figure 10:
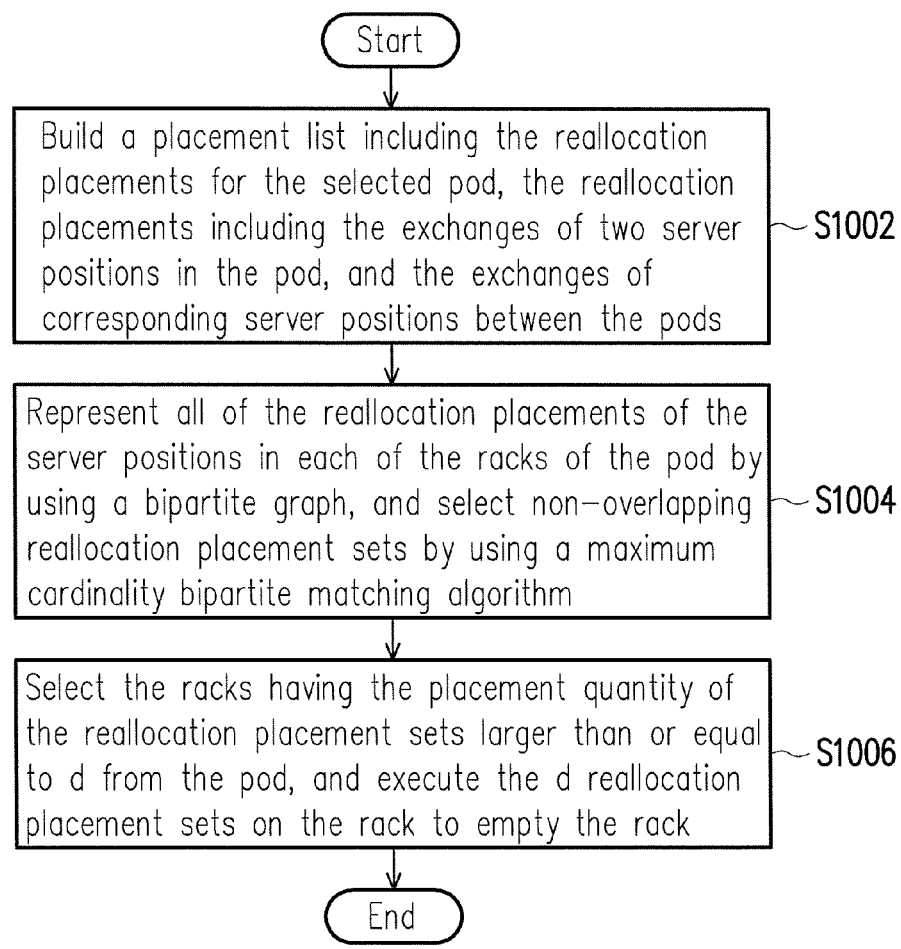
FIG. 10 is a flow diagram of a single pod reallocation procedure according to an embodiment of the invention.

For example, FIG. 10 is a flow diagram of a single pod reallocation procedure according to an embodiment of the invention. With reference to FIG. 10, in the embodiment, the data center executes the single pod reallocation procedure to build a placement list including a plurality of reallocation placements for the selected pod. The reallocation placements include the exchanges of two server positions in the pod, and the exchanges of corresponding server positions between the pods (Step S1002). When the single pod reallocation process builds the placement list, the row and column reallocation placement procedure may be called, for example, and the placement list is requested. A detailed process flow of the row and column reallocation placement procedure is described below.

After obtaining the placement list of the pod, the single pod reallocation procedure represents all of the reallocation placements of the server positions in each of the racks of the pod by using a bipartite graph, and a maximum cardinality bipartite matching algorithm is used to select non-overlapping reallocation placement sets are selected as many as possible by using a maximum cardinality bipartite matching algorithm (Step S1004). Non-overlapping refers to two (or more) servers which cannot be moved to a same usable server position.

The single pod reallocation procedure then select the racks from the reallocation placement sets in which a placement quantity of the reallocation placement sets is larger than or equal to d. The rack is then emptied by d reallocation placements executed on the rack (Step S1006). When the single pod allocation procedure selects the rack, such as by selecting a rack having a sufficient number of placement quantity (e.g., the placement quantity of the reallocation placement set is larger than or equal to d), and when the d reallocation placements are executed on the rack, the single pod reallocation procedure may also select d reallocation placements that are placed in front from the plurality of reallocation placements in the rack. After resource reallocation is completed, the single pod allocation process returns the usable server positions released after executing the reallocation placements back to the main procedure, so as to facilitate the main procedure in allocating services.

It should be noted that, when the main procedure calls the single pod reallocation procedure, different reallocation cost limit parameters may be used. A range of this parameter may be from 1 to 3. Moreover, when the row and column reallocation placement procedure is called by the single pod reallocation procedure, the placement list is built in accordance to the reallocation cost limit provided by the single pod reallocation procedure, so that the single pod reallocation procedure can perform the subsequent reallocation placements. It should be noted that, the reallocation cost of moving once in a same rack is 1.

Figure 11:
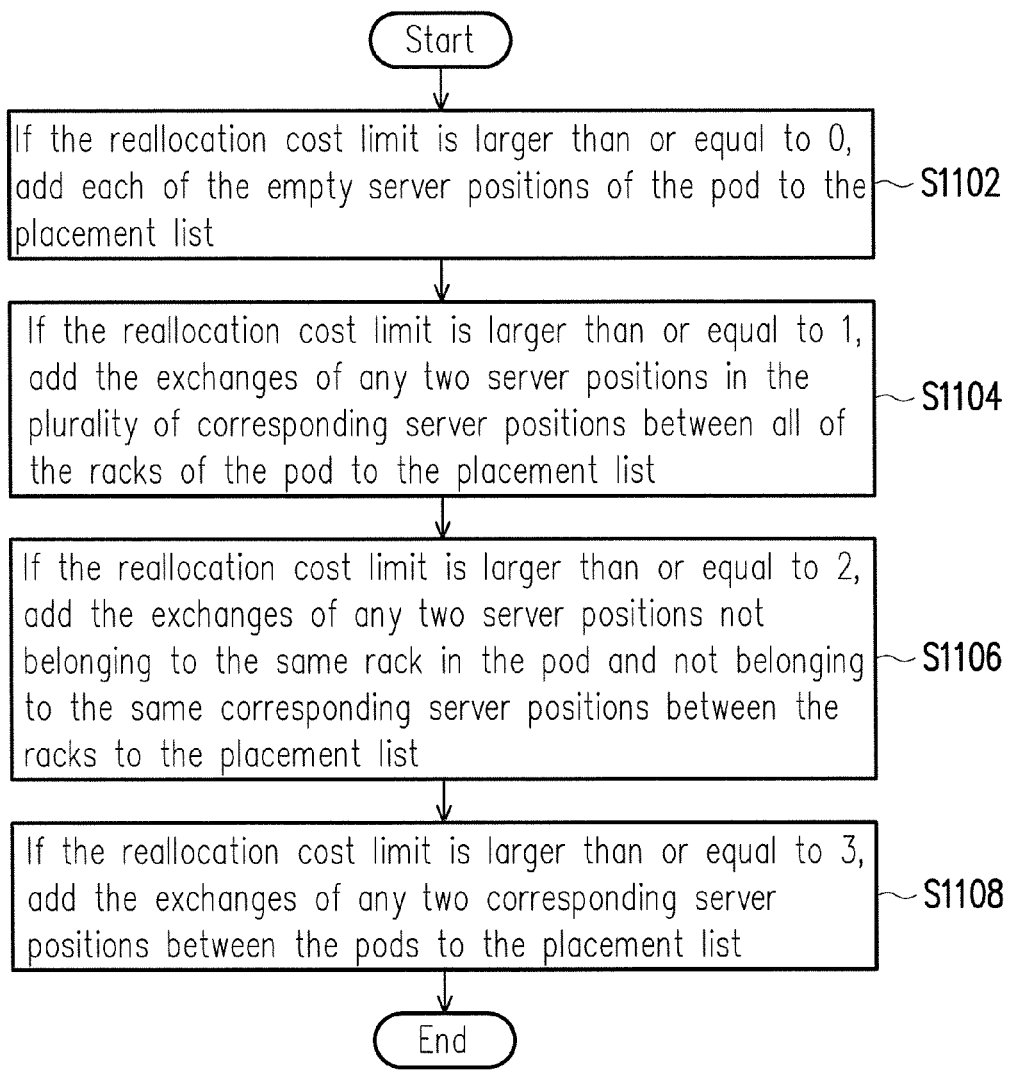
FIG. 11 is a flow diagram of a row and column reallocation placement procedure according to an embodiment of the invention.

For example, FIG. 11 is a flow diagram of a row and column reallocation placement procedure according to an embodiment of the invention. With reference to FIG. 11, according to the predetermined pod and the reallocation cost limit, the present embodiment lists each of the suitable resource reallocation placements in a single pod. The parameter values of the reallocation cost limit may be from 0 to 3, for example. If the reallocation cost limit is larger than or equal to 0, the data center adds each of the empty server positions of the pod to the placement list (Step S1102). If the reallocation cost limit is larger than or equal to 1, the data center adds the exchanges of any two server positions in the plurality of corresponding server positions between all of the racks of the pod to the placement list (Step S1104). This step is similar to the afore-described exchange method depicted in FIG. 8A, and only the server positions between the racks are exchanged. If the reallocation cost limit is larger than or equal to 2, the data center adds the exchanges of any two server positions not belonging to the same rack in the pod and not belonging to the same corresponding server positions between the racks to the placement list (Step S1106). This step is similar to the exchange method depicted in FIG. 8B. In other words, two server positions located in different columns (not belonging to the same rack) and different rows (not belonging to the same corresponding server positions between the racks) are exchanged. If the reallocation cost limit is larger than or equal to 3, the data center adds the exchanges of any two corresponding server positions between all of the pods to the placement list (Step S1108). This step is similar to the position exchanges of the servers 52, 54, and 56 depicted in FIG. 5, where the exchanges across the pods emptied a certain rack in a certain pod, so that the remaining space thereof can be allocated to the d servers.

Accordingly, when the main procedure calls the single pod reallocation procedure, since the reallocation cost limit parameter used is from 1 to 3, therefore, when the single pod reallocation procedure calls the row and column reallocation placement procedure, the row and column reallocation placement procedure adds only the reallocation placements generated by Steps S1104-S1108 to the placement list. Moreover, the replacement list is returned to the single pod reallocation procedure, so that the single pod reallocation procedure can accordingly execute the reallocation placements.

Referring back to the process flow depicted in FIG. 9, after the single pod reallocation is executed, the data center determines whether a rack can be emptied in the pod (Step S910). If a rack can be emptied, the data center may allocate the d servers to the rack (Step S906). After the data center emptied the rack, if the data center determines the vacant remaining space to be larger than d, the d servers may be allocated to a plurality of empty server positions placed in front of the rack. In other words, empty server positions are available from the first server position to the d server position.

On the other hand, in Step S910, if the data center cannot empty the rack, the data center executes the cross-pod reallocation on all of the pods to empty the corresponding server positions of the corresponding racks in the pods, in order to facilitate the remaining space of the corresponding server positions to be larger than or equal to d (Step S912). For example, the data center may select, from the plurality of server positions (a, e) having a quantity larger than or equal to d in the reallocable pods, a first server position (a, e) that is placed ahead to execute the cross-pod reallocation, although the invention is not limited thereto. It should be noted that, in Step S912, the main procedure may call the cross-pod reallocation procedure to execute the cross-pod reallocation on the aforementioned pod.

Figure 12:
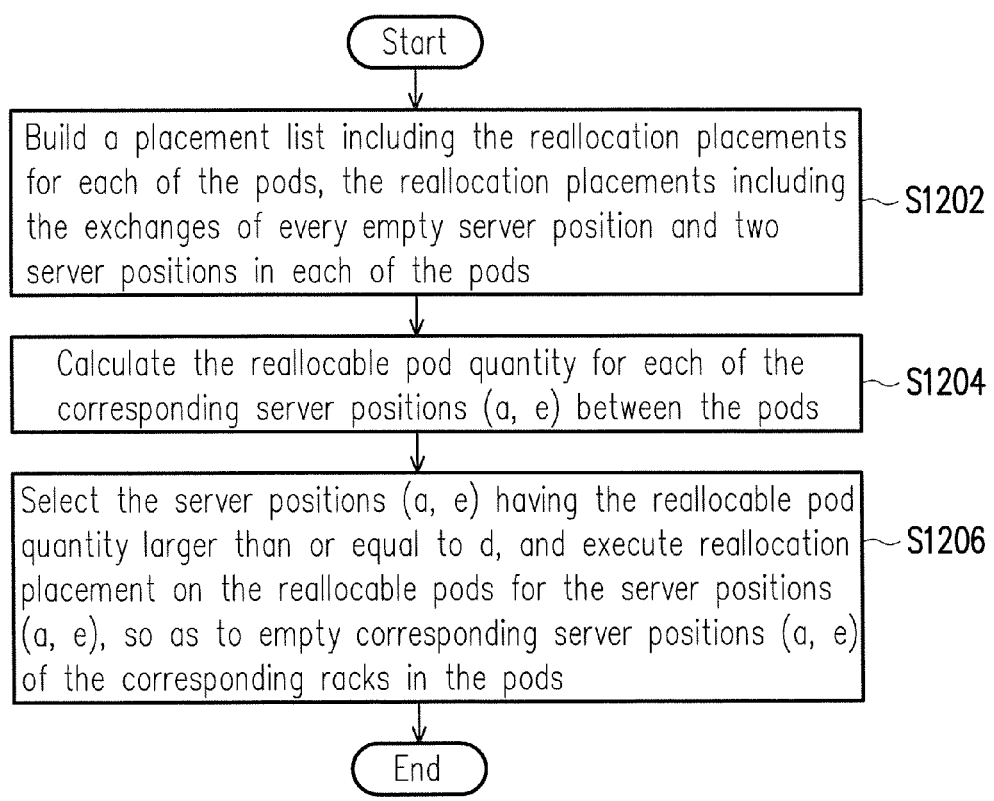
FIG. 12 is a flow diagram of a cross-pod reallocation procedure according to an embodiment of the invention.

For example, FIG. 12 is a flow diagram of a cross-pod reallocation procedure according to an embodiment of the invention. With reference to FIG. 12, in the embodiment, the data center executes the cross-pod reallocation procedure so as to build a placement list including a plurality of reallocation placements for each of the pods. The reallocation placements include the exchanges of every empty server position and two server positions in each of the pods (Step S1202). Similar to the afore-described single pod reallocation procedure, when the cross-pod reallocation procedure of the present embodiment builds the placement list, the row and column reallocation placement procedure may be called to provide the placement list, for example.

It should be noted that, when the main procedure calls the cross-pod reallocation procedure, different reallocation cost limit parameters may be used. A range of this parameter may be from 0 to 2. Moreover, when the row and column reallocation placement procedure is called by the cross-pod reallocation placement procedure, the placement list is built in accordance to the reallocation cost limit provided by the cross-pod reallocation procedure, so that the cross-pod reallocation procedure can perform the subsequent reallocation placements.

Accordingly, when the main procedure calls the cross-pod reallocation procedure, since the reallocation cost limit parameter being used is from 0 to 2, when the cross-pod reallocation procedure calls the row and column reallocation placement procedure, the row and column reallocation placement procedure adds only the reallocation placements generated by Steps S1102-S1106 to the placement list. Moreover, the replacement list is returned to the cross-pod reallocation procedure, so that the cross-pod reallocation procedure can accordingly execute the reallocation placements.

After obtaining the placement list of each pod, the cross-pod reallocation procedure calculates a reallocable pod quantity for each of the corresponding server positions (a, e) between the pods (Step S1204), in which a represents the assigned label of the corresponding aggregation switch, and e represents the assigned label of the corresponding edge switch.

The cross-pod reallocation procedure may select the server positions (a, e) having a reallocable pod quantity larger than or equal to d, and reallocation placement is performed on the reallocable pods for the server positions (a, e), so that corresponding server positions (a, e) of the corresponding racks in the pods are emptied (Step S1206). When selecting the rack, the cross-pod allocation procedure may select a first server position (a, e) having a sufficient reallocable pod quantity, and when the d reallocation placements are executed on the server position (a, e), the cross-pod reallocation procedure may also select the d reallocation placements placed in front of the reallocable reallocation placements for the server positions (a, e). Accordingly, the corresponding server positions (a, e) of the corresponding racks in the pods can be emptied. After resource reallocation is completed, the cross-pod allocation procedure returns the usable server positions released after executing the reallocation placements back to the main procedure, so as to facilitate the main procedure in allocating services.

In view of the foregoing, according to embodiments of the invention, the dynamic planning methods for server resources of the data center adopt specific network resource allocation topologies as well as specific resource allocation and reallocation mechanisms, so that individual cloud services in the data center can use full network bandwidths exclusively, and any arbitrary network connection demands from the cloud services can be satisfied. In order to overcome the bottlenecks and limitations in the resource utilization rate of the specific resource allocation, the resource reallocation techniques in the invention can rapidly generate reasonable resource reallocation placements, such that the placements only need a preferably low reallocation frequency to reallocate the network resources, thereby increasing the resource utilization rate of the data center. At the same time, during the resource reallocation process of the invention, the operating network topology of the data center does not change. Therefore, while maintaining a high resource utilization rate, service stability and reliability are also ensured.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A dynamic planning method for server resources of a data center, adapted to a data center for allocating a service, wherein the service requests to configure d servers, the data center comprising a plurality of pods, each of the pods comprising a plurality of racks respectively connected to a plurality of edge switches, each of the racks being disposed with a plurality of servers, and the servers are sequentially coupled to a plurality of aggregation switches by the connected edge switches, wherein d is a positive integer, the dynamic planning method comprising:

searching, by the data center, for a rack having a remaining resource space larger than or equal to d from the pods, for allocating the d servers to the rack;

if the rack cannot be found, executing, by the data center, a single pod reallocation on one of the pods to empty one of the racks of the pod, in order to facilitate the rack so the remaining resource space of the rack is larger than or equal to d, and allocating, by the data center, the d servers to the rack, wherein the step of executing the single pod reallocation comprises:

building a placement list comprising a plurality of reallocation placements for the pod, the reallocation placements comprising the exchanges of two server positions in the pod, and the exchanges of the corresponding server positions between the pods;

for each of the racks in the pod, representing all of the reallocation placements of the server positions in the rack by using a bipartite graph, and selecting a plurality of non-overlapping reallocation placement sets by using a maximum cardinality bipartite matching algorithm; and selecting the rack from the reallocation placement sets in the pod having a placement quantity larger than or equal to d, and executing d reallocation placements on the rack, so as to empty the rack; and if no rack in the pod can be emptied, executing, by the data center, a cross-pod reallocation on all of the pods to empty the corresponding server positions of the corresponding racks in the pods, in order for the remaining resource space of the corresponding server positions to be larger than or equal to d, and allocating, by the data center, the d servers to the corresponding server positions.

2. The dynamic planning method according to claim 1, wherein the step of executing the cross-pod reallocation on all of the pods to empty the corresponding server positions of the corresponding racks in the pods, in order to facilitate the remaining resource space of the corresponding server positions to be larger than or equal to d comprises:

building a placement list comprising a plurality of reallocation placements for each of the pods, wherein the reallocation placements comprises every empty server position and the exchanges of two server positions in each of the pods;

calculating a reallocable pod quantity for each of the corresponding server positions (a, e) between the pods, wherein a represents an assigned label of the corresponding aggregation switch, and e represents an assigned label of the corresponding edge switch; and selecting the server positions (a, e) having a reallocable pod quantity larger than or equal to d, and executing the reallocation placements on the pods having reallocable server positions (a, e), so as to empty the corresponding server positions (a, e) of the corresponding racks in the pods.

3. The dynamic planning method according to claim 2, wherein the step of selecting the server positions (a, e) having the reallocable pod quantity larger than or equal to d comprises:

selecting a first server position (a, e) placed in front of the server positions (a, e) having the reallocable pod quantity larger than or equal to d.

4. The dynamic planning method according to claim 2, wherein the step of executing the reallocation placements on the pods having reallocable server positions (a, e), so as to empty the corresponding server positions (a, e) of the corresponding racks in the pods comprises:

executing d reallocation placements placed ahead on the pods having reallocable server positions (a, e), so as to empty the corresponding server positions (a, e) of the corresponding racks in the pods.

5. The dynamic planning method according to claim 2, wherein the step of building the placement list comprising the reallocation placements for each of the pods comprises:

adding every empty server position in the pod to the placement list;

adding the exchanges of any two server positions in the plurality of corresponding server positions between the racks of the pod to the placement list; and adding the exchanges of any two server positions not belonging to the same rack in the pod and not belonging to the same corresponding server positions between the racks to the placement list.

6. The dynamic planning method according to claim 1, wherein the step of searching for the rack having the remaining resource space larger than or equal to d from the pods, for allocating the d servers to the rack comprises:

searching for at least one pod having a total remaining resource space that is the most from the pods, wherein the total remaining resource space is a sum of the remaining resource spaces of all of the racks in each of the pods; and selecting a first pod placed in front of the pods to allocate the service.

7. The dynamic planning method according to claim 6, wherein after the step of selecting the first pod placed in front of the pods to allocate the service, the method further comprises:

determining whether the total remaining resource space of the first pod is smaller than d; and if the total remaining resource space is smaller than d, terminating the allocation of the service.

8. The dynamic planning method according to claim 6, wherein the step of executing the single pod reallocation on one of the pods comprises:

executing the single pod reallocation on the first pod.

9. The dynamic planning method according to claim 1, wherein the step of searching for the rack having the remaining resource space larger than or equal to d from the pods, for allocating the d servers to the rack further comprises:

allocating the d servers to the server positions placed in front of the rack.

10. The dynamic planning method according to claim 1, wherein the step of selecting the rack from the reallocation placement sets in the pod having the placement quantity larger than or equal to d comprises:
    selecting a first rack placed in front of the racks from the reallocation placement sets in the pod having the placement quantity larger than or equal to d.

11. The dynamic planning method according to claim 1, wherein the step of executing the d reallocation placements on the rack, so as to empty the rack comprises:
    executing the d reallocation placements in front of the reallocation placements of the rack, so as to empty the rack.

12. The dynamic planning method according to claim 1, wherein the step of building the placement list comprising the reallocation placements for the pod comprises:
    adding the exchanges of any two server positions in the plurality of corresponding server positions between the racks of the pod to the placement list;
    adding the exchanges of any two server positions not belonging to the same rack in the pod and not belonging to the same corresponding server positions between the racks to the placement list; and
    adding the exchanges of any two corresponding server positions between the pods to the placement list.

13. A dynamic planning method for server resources of a data center, adapted to a data center for allocating a service, wherein the service requests to configure d servers, the data center comprising a plurality of pods, each of the pods comprising a plurality of racks respectively connected to a plurality of edge switches, each of the racks being disposed with a plurality of servers, and the servers are sequentially coupled to a plurality of aggregation switches by the connected edge switches, wherein d is a positive integer, the dynamic planning method comprising:
    searching, by the data center, for a rack having a remaining resource space larger than or equal to d from the pods, for allocating the d servers to the rack;
    if the rack cannot be found, executing, by the data center, a cross-rack reallocation on one of the pods to empty one of the corresponding server positions of the racks in the pod, in order for the remaining resource space of the server position to be larger than or equal to d, and allocating, by the data center, the d servers to the server position of each of the racks, wherein the step of executing the cross-rack reallocation comprises:
        building a placement list comprising a plurality of reallocation placements for the pod, wherein the reallocation placements comprises the exchanges of two server positions in the pod, and the exchanges of the corresponding server positions between the pods;
        for the corresponding server position in the rack of the pod, representing all of the reallocation placements of the server position by using a bipartite graph, and selecting a plurality of non-overlapping reallocation placement sets by using a maximum cardinality bipartite matching algorithm; and
        selecting the server position having a placement quantity of the reallocation placement sets larger than or equal to d from the corresponding server positions of the rack, and executing d reallocation placements on the server position, so as to empty the server position; and
    if no server position in the pod can be emptied, executing, by the data center, a cross-pod reallocation on all of the pods to empty the corresponding server positions of the corresponding racks in the pods, in order for the remaining resource space of the corresponding server positions to be larger than or equal to d, and allocating, by the data center, the d servers to the corresponding server positions.

14. The dynamic planning method according to claim 13, wherein the step of searching for the rack having the remaining resource space larger than or equal to d from the pods, for allocating the d servers to the rack comprises:
    searching for at least one pod having a total remaining resource space that is the most from the pods, wherein the total remaining resource space is a sum of the remaining resource spaces of all of the racks in each of the pods; and
    selecting a first pod placed in front of the pods to allocate the service.

15. The dynamic planning method according to claim 14, wherein after the step of selecting the first pod placed in front of the pods to allocate the service, the method further comprises:
    determining whether the total remaining resource space of the first pod is smaller than d; and
    if the total remaining resource space is smaller than d, terminating the allocation of the service.

16. The dynamic planning method according to claim 14, wherein the step of executing the cross-rack reallocation on one of the pods comprises:
    executing the cross-rack reallocation on the first pod.

17. The dynamic planning method according to claim 13, wherein the step of searching for the rack having the remaining resource space larger than or equal to d from the pods, for allocating the d servers to the rack further comprises:
    allocating the d servers to the server positions placed in front of the rack.

18. The dynamic planning method according to claim 13, wherein the step of selecting the server position having the placement quantity of the reallocation placement sets larger than or equal to d from the corresponding server positions of the rack comprises:
    selecting a first server position placed in front of the server positions having the placement quantity of the reallocation placement sets larger than or equal to d from the corresponding server positions of the rack.

19. The dynamic planning method according to claim 13, wherein the step of executing the d reallocation placements on the server position, so as to empty the server position comprises:
    executing the d reallocation placements placed in front of the reallocation placements for the server position, so as to empty the server position.

20. The dynamic planning method according to claim 13, wherein the step of building the placement list comprising the reallocation placements for the pod comprises:
    adding the exchanges of any two server positions in each rack of the pod to the arrangement list;
    adding the exchanges of any two server positions not belonging to the same rack in the pod and not belonging to the same corresponding server positions between the racks to the arrangement list; and
    adding the exchanges of any two corresponding server positions between the pods to the arrangement list.

* * * * *